United States Patent
Okada et al.

(10) Patent No.: US 9,719,617 B2
(45) Date of Patent: Aug. 1, 2017

(54) THREADED JOINT FOR STEEL PIPES

(75) Inventors: Takashi Okada, Wakayama (JP);
Keiichi Nakamura, Wakayama (JP);
Masaaki Sugino, Nishinomiya (JP);
Suguru Yamaguchi, Amagasaki (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 226 days.

(21) Appl. No.: 13/088,460

(22) Filed: Apr. 18, 2011

(65) Prior Publication Data

US 2011/0241340 A1  Oct. 6, 2011

Related U.S. Application Data

(63) Continuation of application No. PCT/JP2009/068303, filed on Oct. 20, 2009.

(30) Foreign Application Priority Data

Oct. 20, 2008  (JP) .................. 2008-270379

(51) Int. Cl.
*F16L 15/00* (2006.01)
*E21B 17/042* (2006.01)

(52) U.S. Cl.
CPC .......... *F16L 15/004* (2013.01); *E21B 17/042* (2013.01)

(58) Field of Classification Search
USPC ................. 285/333–334, 355, 390
See application file for complete search history.

(56) References Cited

U.S. PATENT DOCUMENTS

| 2,992,019 | A | * | 7/1961 | MacArthur | ......... E21B 17/0423 285/110 |
| 3,856,337 | A | * | 12/1974 | Ehm | ....................... F16L 15/04 285/334 |
| 3,870,351 | A | * | 3/1975 | Matsuki | ................ E21B 17/042 285/334 |
| 4,796,923 | A | * | 1/1989 | Liggins | ................. F16L 15/004 285/148.19 |
| 4,958,862 | A | * | 9/1990 | Cappelli | ............... F16L 15/004 285/334 |
| 4,984,829 | A | * | 1/1991 | Saigo | .................... F16L 15/004 285/334 |

(Continued)

FOREIGN PATENT DOCUMENTS

| CN | 00814495.8 | 1/2005 |
| JP | 2002-522713 | 7/2002 |

(Continued)

*Primary Examiner* — Aaron Dunwoody
*Assistant Examiner* — Fannie Kee
(74) *Attorney, Agent, or Firm* — Clark & Brody

(57) ABSTRACT

In a threaded joint for steel pipes comprising a pin (1) and a box (2), each having a threaded portion (11 or 21), a sealing surface (13 or 23), and a shoulder surface (14, 15 or 24, 25), the sealing surface (13) of the pin (1) is formed by a tapered surface, and the sealing surface (23) of the box (2) is formed by a first curved surface portion with a large radius of curvature in the range of 15-120 mm, a tapered surface portion, and a second curved surface portion with a large radius of curvature again in the range of 15-120 mm.

4 Claims, 4 Drawing Sheets

(56) References Cited

U.S. PATENT DOCUMENTS

| | | | | |
|---|---|---|---|---|
| 6,045,165 | A * | 4/2000 | Sugino | F16L 15/004 285/333 |
| 6,511,102 | B2 * | 1/2003 | Quadflieg | F16L 15/004 285/333 |
| 7,334,821 | B2 * | 2/2008 | Dutilleul | E21B 17/042 285/333 |
| 2002/0017788 | A1 | 2/2002 | Krug et al. | |

FOREIGN PATENT DOCUMENTS

| | | |
|---|---|---|
| JP | 2003-512588 | 4/2003 |
| JP | 2006-526747 | 11/2006 |
| WO | 01/29476 | 4/2001 |
| WO | 2004/109173 | 12/2004 |

* cited by examiner

THREADED JOINT FOR STEEL PIPES

TECHNICAL FIELD

This invention generally relates to a threaded joint used for connecting steel pipes such as oil country tubular goods (OCTG) including tubing and casing used for the exploration and production of crude oil and natural gas, riser pipes, and line pipes. More particularly, the present invention relates to a threaded joint for steel pipes having a threaded portion, a sealing surface, and a shoulder surface and having excellent pressure-resistant sealing performance.

BACKGROUND ART

Threaded joints for steel pipes, which are widely used for connecting steel pipes used in equipment of the oil-producing industries such as oil country tubular goods and riser pipes, are constituted by a pin, which is an element with male or external threads provided on the end of a first tubular member, and a box, which is an element with female or internal threads provided on the end of a second tubular member. Connection of a threaded joint is carried out by threadingly engaging the male threads and the female threads, which are both tapered threads.

Typically, the first tubular member is a pipe such as a steel pipe for use in oil country tubular goods and the second tubular member is a different member in the form of a coupling. This type of threaded joint for steel pipes is referred to as a coupling type. In a coupling-type joint, a pin is formed on both ends of the pipe, and a box is formed on both sides of the coupling. There are also integral threaded joints for steel pipes in which a pin is formed on the outer surface on one end of a pipe and a box is formed on the inner surface of the other end of the pipe. In this case, the first tubular member is a first pipe, and the second tubular member is a second pipe, and the two pipes are connected without a coupling.

Oil country tubular goods are usually connected to each other using standard threaded joints prescribed by API (American Petroleum Institute) standards. However, in recent years, as the environments in which excavation and production of crude oil and natural gas are carried out have become increasingly severe, special high-performance threaded joints referred to as premium joints are increasingly being used.

In a premium joint, both the pin and the box have, in addition to tapered threads which make it possible to fasten the pin and the box, a sealing surface provided on a peripheral surface in the vicinity of the threads and a shoulder surface which acts as a stopper during connection of the joint. Radial interference is provided between the sealing surfaces of the pin and the box. When the joint is tightened until the shoulder surfaces of the pin and the box abut each other, the sealing surfaces of both members intimately contact each other around the entire periphery of the joint so as to form a seal by metal-to-metal contact. The shoulder surfaces not only functions as stoppers at the time of tightening but also bear a compressive load acting on the joint.

FIGS. 7(A) and 7(B) show schematic explanatory views of a typical premium threaded joint for steel pipes of the coupling type in which FIG. 7(B) is an overall view and FIG. 7(A) is an enlarged view of a portion of the joint. As shown in FIGS. 7(A) and 7(B), this type of threaded joint for steel pipes has a pin 1 which is a male threaded element provided on the end portion of a pipe and a box 2 which is a corresponding female threaded element provided on both sides of a coupling. On its outer surface, the pin 1 has tapered male threads 11 and an unthreaded cylindrical tip portion referred to as a lip (referred to below as a lip portion) 12 adjacent to the male threads 11. The lip portion 12 has a sealing surface 13 on its outer periphery and a shoulder surface 14 on its end surface. The sealing surface 13 is a tapered surface (frustoconical surface) which gradually decreases in diameter towards the tip of the pin.

Correspondingly, the box 2 has, on its inner surface, tapered female threads 21, a sealing surface 23, and a shoulder surface 24 which can threadingly engage with or contact or abut against the tapered male threads 11, the metal sealing surface 13, and the shoulder surface 14, respectively, of the pin 1. As shown in the figure, a lip portion having a shoulder surface on its end surface is in most cases provided at the tip of the pin. A gap 31 between the pin and the box is formed at the end of the lip portion adjacent to the male threads for the purpose of collecting a liquid or semisolid lubricant which was applied to the surfaces of the pin and/or box in order to prevent galling and seeped out from the applied surface during tightening (make-up) of the joint due to intimate contact of the threads and the sealing surfaces of the pin and the box.

Formerly vertical wells were dominant. In such wells, a threaded joint for steel pipes had sufficient performance if it could withstand the tensile load of the weight of pipes connected to it and if it could prevent leakage of high pressure fluid passing through its interior. However, in recent years, as wells have become deeper, as sloping wells or horizontal wells having a well bore which is curved underground have increased in number, and as development of wells in severe environments such as in the deep sea or in polar regions has increased, a strong demand has developed for an increase in resistance to compression and improvements in sealing performance of threaded joints for steel pipes, particularly under internal and external pressures.

In order to improve the resistance to compression and sealing performance of a premium threaded joint under internal and external pressures, patent document WO 2004/109173 (hereinafter referred to as Patent Document 1) proposes a threaded joint for steel pipes which, as shown in FIG. 2, has an extended lip portion including a nose portion 16 between the sealing surface 13 and the shoulder surface 14 at the end of a pin 1. The nose portion 16 of the pin 1 provides a non-contacting region 18 in which the opposing surfaces of the pin 1 and the box 2 do not contact each other. On the other hand, the sealing surfaces 13 and 23 and the shoulder surfaces 14 and 24 of the pin and the box contact each other. By elongating the lip portion of the pin 1 so as to form a nose portion 16 having a non-contacting region 18 with a cylindrical outer surface which does not contact the box between the end surface and the sealing surface 13 of the pin, the wall thickness of the lip portion and accordingly the wall thickness of the shoulder surface and the sealing surface can be increased within the constraints of a limited pipe wall thickness, and the resistance to compression of a threaded joint for steel pipes and its ability to form a seal which is resistant to internal and external pressure can be markedly increased.

It is disclosed in Patent Document 1 that as shown in FIG. 4, the sealing surface of a box may be of the shape having a combination of a toroidal surface (R) (a surface formed by rotating an arc about the center of the joint axis) on the side of the sealing surface closer to the threaded portion and a tapered surface (TA) (a surface formed by rotating a straight line about the center of the joint axis) on the side of the sealing surface closer to the shoulder, while the sealing surface of a pin is formed from a tapered surface preferably with the same slope as the tapered surface TA of the box. This shape can increase the stability of contact pressure of the sealing surfaces of the pin and the box under a variety of operating conditions.

FIG. 5 is a schematic view showing different shapes of the sealing surface of a box which contacts a tapered shape of the sealing surface of a pin. FIG. 5(A) shows an example in which the sealing surface of a box is constituted solely by a tapered surface (TA), FIG. 5(B) shows an example in which it is constituted solely by a curved surface (R), and FIG. 5(C) shows an example in which it is constituted by a combination of a tapered surface (TA) and a curved surface (R). In each case, the pin is constituted solely by a tapered surface.

As shown in FIG. 5(A), when the box is a tapered sealing surface (TA) as in the sealing surface of the pin, contact between the sealing surfaces of the pin and the box is concentrated at the border 51 thereof closest to the threads. As shown in FIG. 5(B), when the sealing surface of the box is a curved surface (R) and that of the pin is a tapered surface, the area of contact between the sealing surfaces of the pin and the box decreases, and the stability of contact may worsen. As shown in FIG. 5(C), when the sealing surface of the box is a combined surface constituted by a tapered surface (TA) and a curved surface (R) and that of the pin is a tapered surface, as described in Patent Document 1, the stability of contact can be increased under a variety of conditions of use.

SUMMARY OF THE INVENTION

The threaded joint for steel pipes proposed in Patent Document 1 in which the sealing surface of a box is made a combination of a toroidal surface closer to the threaded portion and a tapered surface closer to the shoulder normally exhibits adequate sealing performance even when a tensile or compressive load is applied while internal or external pressure is being applied to the threaded joint.

However, under severe test conditions for sealing performance as specified in ISO 13679 in which a tensile and compressive load and an internal pressure and external pressure of a magnitude such that the pipe body undergoes plastic deformation over its entire surface are repeatedly applied, the present inventors found that even a threaded joint as just described can develop microgalling on its sealing surfaces. Such severe sealing test conditions were established in light of the conditions of use of oil country tubular goods, which have been becoming increasingly severe in recent years. Accordingly, even with the above-described threaded joint for steel pipes, microgalling may develop under some conditions, and in the worst case, sealing performance is impaired.

The object of the present invention is to solve the problem of microgalling which can develop in the sealing surfaces of a threaded joint for steel pipes.

The present inventors performed investigations of the shape of the sealing surfaces of the threaded joint for steel pipes on the basis of the shape described in Patent Document 1, and they obtained the following findings by analysis using the finite element method (FEM) and by sealing tests.

(1) In a severe sealing test as set forth in ISO 13679, for example, in which a tensile and compressive load or an internal and external pressure of a magnitude such that a pipe body undergoes plastic deformation over its entire surface are repeatedly applied many times, the sealing surfaces slide in the axial direction back and forth with a minute amplitude during the test. As a result, when the peak contact pressure is large such as when there is a large amount of interference, the sealing surfaces become roughened and develop microgalling due to this minute back-and-forth sliding.

(2) This microgalling occurs most easily on the shoulder (or rear) side of the sealing surfaces of the box. This is because due to external pressure, the threaded portion of the pin undergoes a decrease in diameter and threaded engagement of the threads of the pin and the box becomes loose, and as a result, the amplitude of the above-described back-and-forth sliding increases. In addition, under a load due to external pressure, due to a reaction to the decrease in diameter of the threaded portion of the pin, the tip of the lip of the pin conversely undergoes an increase in diameter (as seen in a longitudinal cross section, deformation occurs such that the tip of the lip bends outwards). Therefore, the region of primary contact between the sealing surfaces of the pin and the box shifts from the thread side towards the shoulder side.

FIG. 6 is a schematic view showing the locations of contact between the sealing surfaces of a pin and a box. More specifically it shows the locations of contact of the sealing surface 13 of a pin and the sealing surface 23 of a box. The sealing surface 23 of the box is distinguished from adjoining regions by border 51 and border 56. The sealing surfaces normally contact each other in a region closer to the threaded portion at the time of make-up as schematically shown by contact pressure distribution region 61. However, if an external pressure is applied, contact takes place in a region closer to the shoulders as schematically shown by contact pressure distribution region 62.

Based on the above-described findings, the present inventors confirmed that the occurrence of microgalling in a severe sealing test can be prevented by providing the sealing surface of a box with a large radius of curvature on the rear (shoulder) side thereof, in addition to a large radius of curvature on the opposite side closer to the threaded portion. This is thought to be because contact of the sealing surfaces of the pin and the box in which an end portion of the shoulder side of the sealing surface of the box has a large radius of curvature prevents the peak contact pressure from becoming large in this end portion, as experienced when this end portion has a small radius of curvature (a radius of curvature R of 1 mm to 6 mm, for example.

A threaded joint for steel pipes according to the present invention comprises a pin and a box in which the pin has male threads and a lip portion having a sealing surface and a shoulder surface and the box has female threads, a sealing surface, and a shoulder surface, at the time of make-up, the male threads threadingly engaging with the female threads, the sealing surface of the pin sealingly contacting the corresponding sealing surface of the box, and the shoulder surface of the pin abutting the shoulder surface of the box, characterized in that the sealing surface of the pin is a tapered surface and the sealing surface of the box comprises, in the direction from the female threads towards the shoulder surface, a first curved surface portion with a large radius of curvature, a tapered surface, and a second curved surface portion with a large radius of curvature.

The first curved surface portion with a large radius of curvature may comprise a plurality of curved surfaces. Similarly, the second curved surface portion with a large radius of curvature may comprise a plurality of curved surfaces.

The term "sealing surface" used herein refers to a region including an unthreaded portion where a pin and a box intimately contact each other so as to form a gas-tight, metal-to-metal contact seal. The expression "sealingly contacting" indicates performing such intimate contact between the sealing surfaces of the pin and the box. In each of the pin and the box, the sealing surface is distinguished from adjoining regions by a point where the slope is discontinuous or by a curve having a small radius of curvature (at most 6 mm).

By a curved surface with a large radius of curvature is meant a surface having a radius of curvature R of from 15 mm to 120 mm. As long as a sealing surface of a threaded joint, which is the main part designed by the present invention and which normally has a length of 2.5-8 mm, is concerned, if the first or second curved surface portion has a radius of curvature R exceeding 120 mm, the shape of the curved surface approaches that of a tapered surface (a surface having straight line cross section in the axial direction of the threaded joint) so that this portion of the sealing surface can no longer function as a curved surface (a surface having a curved line cross section in the axial direction of the threaded joint) in the limited length of the sealing surface. If the radius of curvature R of the first or second curved surface portion is smaller than 15 mm, the contact pressure applied to this curved portion in the sealing surface becomes high, and the contact stability of the sealing surface is impaired.

A curved surface with a large radius of curvature is a surface produced by rotating a curve (an arc of a circle, an arc of an ellipse, a parabola, or the like) having the above-described large radius of curvature about the axis of the threaded joint (joint axis), which is in alignment with the axis of a steel pipe connected by the threaded joint. As stated before, each of the first and second curved surface portions may be formed from a combination of a plurality of curved surfaces each having a large radius of curvature.

A tapered surface is a surface produced by rotating a straight line which is sloped with respect to the joint axis about the joint axis.

A threaded joint for steel pipes according to the present invention functions more effectively when the angle of slope of the sealing surfaces of the pin and the box is from 5 to 25 degrees with respect to the joint axis. The angle of slope of the sealing surface means the slope with respect to the joint axis of the tapered surfaces in the sealing surfaces of the pin and the box, namely, the tapered surface portion in the sealing surface of the box and the tapered sealing surface of the pin.

Preferably a threaded joint for steel pipes according to the present invention has a structure of a pin in which the shoulder surface of the pin is disposed on the end surface of the pin, the sealing surface of the pin is positioned in the vicinity of the end of male threads in the side closer to the end surface of the pin, and a nose portion which does not contact the opposing portion of the box is provided between the sealing surface and the shoulder surface of the pin. Such a threaded joint can exhibit improved performance with respect to resistance to compression and resistance to a combined load such as compression or tension combined with external pressure.

It is also preferable in a threaded joint for steel pipes according to the present invention that the shoulder surface of the pin comprise two distinct adjoining surfaces, main shoulder surface on the radially inner side and sub-shoulder surface on the radially outer side, and the corresponding shoulder surface of the box opposing the shoulder surface of the pin comprise two distinct adjoining surfaces, main shoulder surface on the radially inner side and sub-shoulder surface on the radially outer side, the main shoulder surfaces of the pin and box being disposed so as to prevent a radially inward deformation of the lip end portion, the sub-shoulder surfaces of pin and box being disposed so as to limit a radially outward deformation of the lip end portion, the main shoulder surface of the pin having a greater radial dimension than the sub-shoulder surface of the pin, and at least the main shoulder surface of the pin being in axial abutment with the corresponding or opposing main shoulder surface of the box.

In a threaded joint for steel pipes according to the present invention, the sealing surface of the box is formed by a first and second curved surface portions both with a large radius of curvature and a tapered surface between these two curved surface portions. As a result, when a tensile load and a compressive load and an internal and external pressure of a magnitude causing plastic deformation over the entire surface of the pipe body are repeatedly applied, the occurrence of microgalling in the sealing surfaces of the pin and the box can be reduced.

In addition, by providing a threaded joint for steel pipes with a sealing surface of the above-described structure having a nose portion which does not contact the opposing portion of a box between the sealing surface and the shoulder surface of a pin or having a main and a sub-shoulder surface in which the main shoulder surface is provided so as to prevent radially inward deformation of the end portion of the lip of the pin and the sub-shoulder surface is provided so as to limit radially outward deformation of the end portion of the lip, it is possible to improve the resistance to compression and the overall sealing performance under a combined load comprising compression and external pressure or tension and external pressure.

BRIEF EXPLANATION OF THE DRAWINGS

FIGS. 1(A) and 1(B) show schematic cross-sectional views of a threaded joint for steel pipes according to the present invention in which FIG. 1(A) is a partial view of the vicinity of the lip portion of a pin and FIG. 1(B) is an overall view showing the pin and a box.

FIGS. 3(A) to 3(D) show schematic views of a sealing surface of a box in a threaded joint for steel, in which FIGS. 3(A) and 3(B) show a sealing surface according to the present invention comprising a first curved surface portion with a large radius of curvature (RA), a tapered surface portion (TA), and a second curved surface portion with a large radius of curvature (RB), FIG. 3(C) shows a sealing surface according to the present invention having a structure comprising a third curved surface portion with a large radius of curvature (RC), a first curved surface portion with a large radius of curvature (RA), a tapered surface portion (TA), and a second curved surface portion with a large radius of curvature (RB), and FIG. 3(D) shows a sealing surface in a comparative threaded joint comprising a curved surface portion with a large radius of curvature (RA) and a tapered surface portion (TA).

FIG. 5(A) is an example in which the box has a tapered surface (TA) and a pin has a tapered surface (TA), FIG. 5(B) is an example in which a box has a curved surface (RA) and a pin has a tapered surface (TA), and FIG. 5(C) is an example in which a box has a combined surface comprising a tapered surface (TA) and a curved surface (RA), while a pin has a tapered surface (TA).

MODES FOR CARRYING OUT THE INVENTION

Figure 1A:
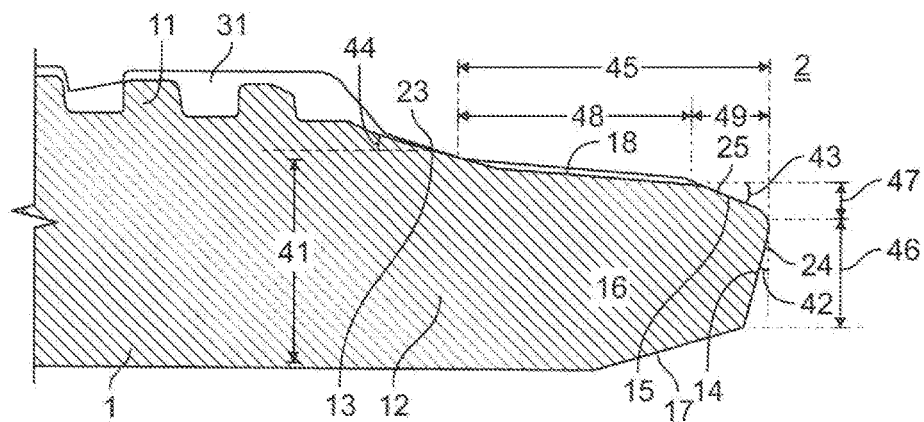

A threaded joint for steel pipes according to the present invention will be explained while referring to the drawings.

Figure 1B:
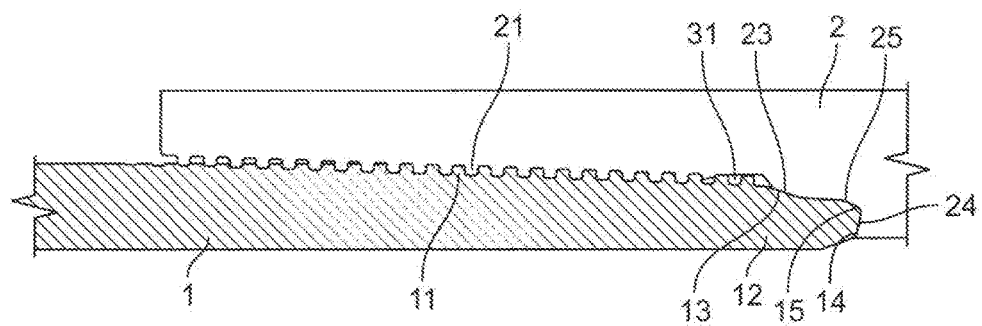

FIGS. 1(A) and 1(B) show schematic cross-sectional views of a threaded joint for steel pipes according to the present invention. FIG. 1(A) is a partial view showing the vicinity of the lip portion of a pin and FIG. 1(B) is an overall view showing the pin and a box. This threaded joint is of the premium threaded joint type and is constituted by a pin 1 and a box 2 each having tapered threads and an unthreaded sealing surface. FIG. 1(B) shows an example of tapered threads.

The pin 1 comprises a threaded portion having male threads 11 and a lip portion 12 having a sealing surface 13 positioned closer to the end of the pipe than the threaded portion. The end surface of the tip of the lip portion forms a shoulder surface. As shown in the drawings, the sealing surface 13 of the pin 1 is normally positioned on the side of the lip portion 12 which is adjacent to or in the vicinity of the threaded portion 11.

The box 2 has a threaded portion having female threads 21 which threadingly engage with the male threads 11 of the pin 1, a sealing surface 23 which contacts the sealing surface 13 of the pin 1 so as to form an intimate seal (a metal-to-metal seal), and a shoulder surface which abuts against the shoulder surface of the pin in the axial direction of the joint.

A portion of the male threads adjacent to the lip portion 12 may be a non-engaging or incomplete thread which does not mesh with the female thread 21 of the box 2.

The lip portion 12 of the pin 1 of the threaded joint for steel pipes shown in FIG. 1 which has a mean thickness 41 is elongated so that it has a nose portion 16 between the sealing surface 13 and the end of the pin 1. The nose portion forms a non-contacting region 18 in which the pin does not contact the opposing surface of the box for a certain axial length. Therefore, the lip portion is longer compared to the typical premium joint shown in FIG. 7.

Figure 2:
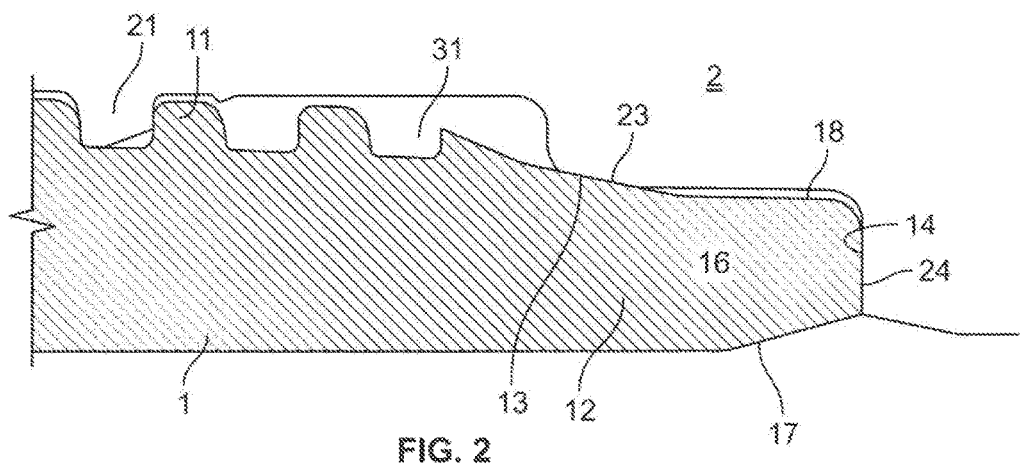
FIG. 2 is a schematic cross-sectional view showing the vicinity of the lip portion of the pin of a threaded joint for steel pipes described in Patent Document 1.

The main part of the non-contacting region 18 of each of the pin and the box may be formed either by a tapered surface (with a diameter decreasing toward the tip of the pin) as shown in FIG. 1(A) or cylindrical surface with a uniform diameter as shown in FIG. 2. The radial clearance in the main part of the non-contacting region between the pin and the box is preferably constant along its length.

As illustrated, the nose portion 16 having an axial length 45 includes the non-contacting region having an axial length 48 and a shoulder portion having an axial length 49 (in the illustrated embodiment, the axial length 49 is of a sub-shoulder portion 15 as described below), while the lip portion 12 includes the sealing surface 13 and the nose portion 16. The axial length 45 of the nose portion 16 of the pin 1 is around 4-22 mm for a pipe of the size used in oil country tubular goods having an outer diameter of approximately 50-550 mm. The axial length 48 of the non-contacting portion 18 in the nose portion 16 of the pin 1 preferably comprises about 45-90% of the axial length 45 of the nose portion 16.

The greater the thicknesses of the sealing surface and the nose portion of the lip portion, the greater their ability to seal against external pressure, so when a chamfer 17 is formed on the inner surface of the end of the lip portion in order to prevent turbulence by increasing circularity, the angle of the chamfer 17 with respect to the joint axis is preferably a rather small angle in the range from 9 to 30 degrees. A chamfer with a shallow angle may similarly be provided on the inner surface of the box 2 adjoining the pin 1, as depicted in FIG. 2.

In this example, the shoulder surface at the end of the pin 1 has a two-step contour comprising a main shoulder surface portion 14 on the radially inner side of the joint and a sub-shoulder surface portion 15 on the radially outer side of the joint. The main shoulder surface portion 14 of the pin 1 is a reverse shoulder surface having a negative angle 42 with respect to a plane perpendicular to the joint axis. On the other hand, the sub-shoulder surface portion 15 has a positive angle 43 with respect to a plane perpendicular to the joint axis. The main shoulder portion 14 has a radial dimension 46 (thickness projected on a plane perpendicular to the joint axis) which is larger than the radial dimension 47 of the sub-shoulder surface 15.

Correspondingly, the shoulder surface of the box 2 has a two-step contour comprising a thicker main shoulder surface portion 24 on the radially inner side of the joint and a thinner sub-shoulder surface portion 25 on the radially outer side of the joint. Preferably, the junction between the main shoulder surface portion 14 and the sub-shoulder surface portion 15 of the pin 1 forms a rounded apex having a radius of at most 1.5 mm and the box 2 has a corresponding rounded recess between the main shoulder portion 24 and the sub-shoulder portion 25.

The reverse angle 42 of the main shoulder surfaces 14 and 24 is such that the absolute value (in actuality it is a negative angle) of the slope 42 of the main shoulder surface 14 of the pin 1 with respect to a plane perpendicular to the joint axis is preferably 5 to 25 degrees and more preferably 8 to 20 degrees.

The slope 43 of the sub-shoulder surfaces 15 and 25 with respect to the joint axis is preferably 5 to 30 degrees (namely, the slope with respect to a direction perpendicular to the joint axis is at least +60 degrees and at most +85 degrees), and more preferably it is larger than the slope 44 of the sealing surfaces.

The sub-shoulder surfaces 15 and 25 are normally designed so as not to contact each other during a normal made-up state. The sub-shoulder surfaces are intended to contact each other when a high compressive load is applied to the threaded joint or when an excessive tightening torque is applied in order to suppress outwards deformation of the lip portion. However, the sub-shoulder surfaces 15 and 25 may be designed so as to contact each other during a normal made-up state as long as the performance of the sealing surfaces 13 and 23 is not adversely affected.

In an embodiment of a threaded joint having a shoulder surface with the above-described two-step contour, the axial length 45 of the nose portion 16 of the pin 1 is substantially equal to the sum of the axial length 48 of the non-contacting region 18 and the axial length 49 of the sub-shoulder surface portion 15 which is also normally non-contacting with the opposing surface of the box.

With a threaded joint of the embodiment shown in FIGS. 1(A) and 1(B), by providing a nose portion 16 having a non-contacting region 18 in a position closer to the end of the pin than the sealing surface 13 and by providing the shape the shoulder surface at the end of the pin with a two-step contour including a main shoulder surface portion 14 and a sub-shoulder surface portion 15, unstable deformation of the lip portion is suppressed, excellent resistance to compression is obtained, and the overall sealing performance under a repeated combined load is greatly improved.

In a threaded joint for steel pipes according to the present invention, the sealing surface of a pin is a tapered surface, while the sealing surface of a box comprises, in the direction from the female threads toward the shoulder portion, a first curved surface portion with a large radius of curvature, a tapered surface portion, and a second curved surface portion with a large radius of curvature. Namely, the first curved surface portion is located closer to the female threads and the second curved surface portion is located closer to the shoulder portion.

As mentioned previously, a surface with a large radius of curvature has a radius of curvature R of 15-120 mm. A surface with a large radius of curvature is produced by rotating a curved line having the above-described large curvature (a circular arc, an elliptical arc, a parabola, or the like) about the joint axis. A plurality of these curved surface portions may be combined in a surface with a large radius of curvature.

A tapered surface is formed by rotating a straight line which is sloped with respect to the joint axis about the joint axis.

Figure 3A:
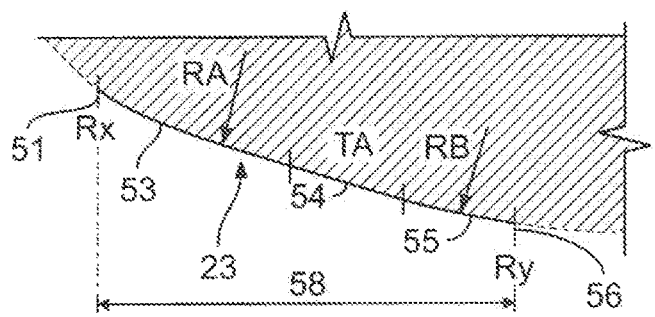
Figure 3B:
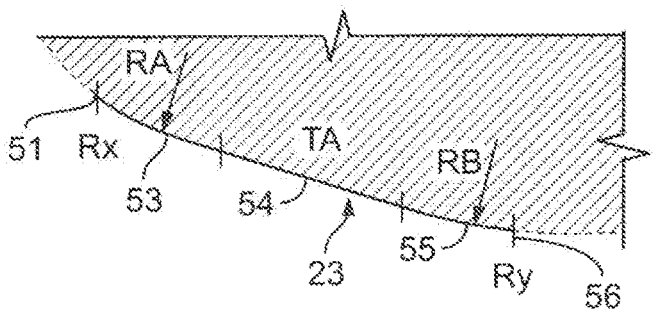
Figure 3C:
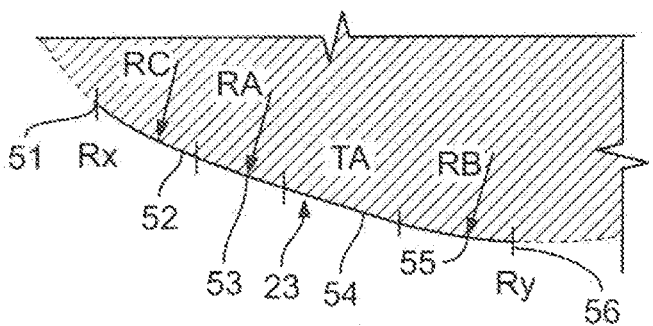
Figure 3D:
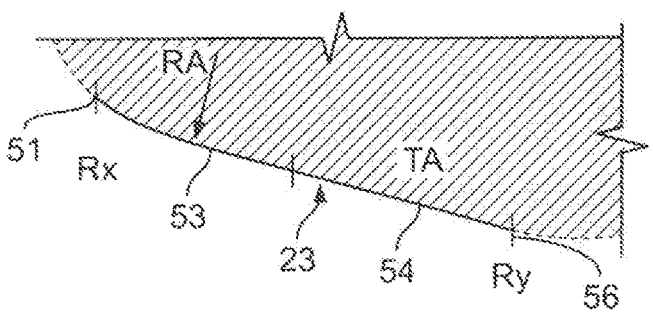
Figure 4:
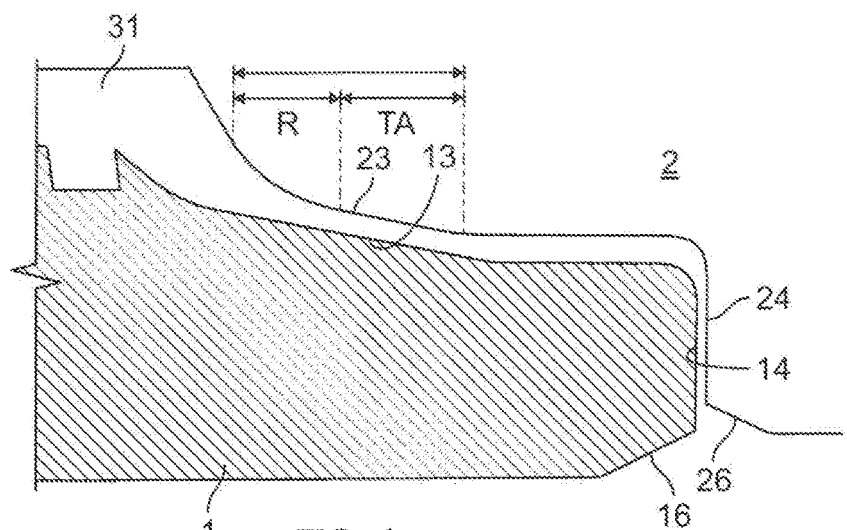
FIG. 4 is a schematic view showing one example of the sealing surfaces of a pin and a box of a threaded joint for steel pipes described in Patent Document 1 and comprising a curved surface portion with a large radius of curvature (R) and a tapered surface portion (TA) as in FIG. 3(D).
Figure 5A:
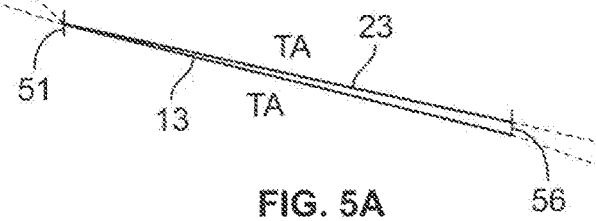
FIGS. 5(A) to 5(C) show schematic views explaining the shapes of the sealing surfaces of a box and a pin.
Figure 5B:
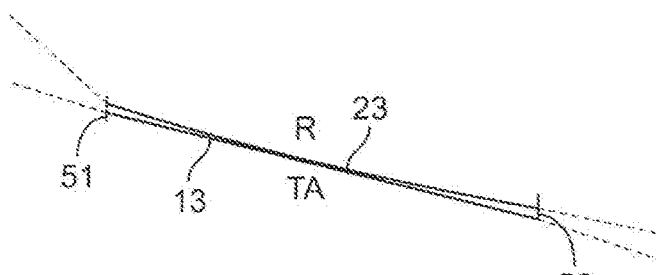
Figure 5C:
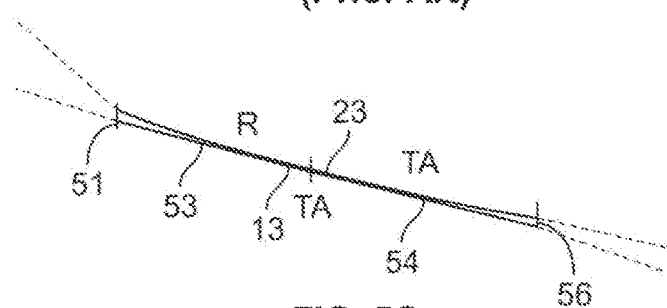
Figure 6:
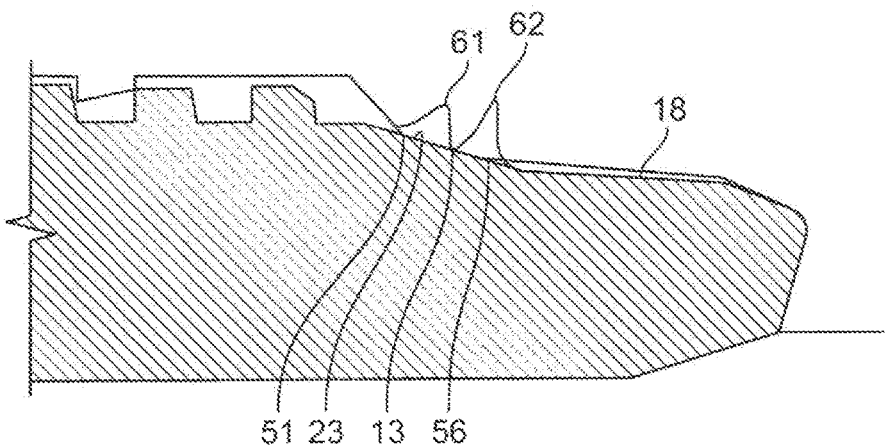
FIG. 6 is a schematic view showing the contact portions of a sealing surface.

FIG. 3(A) to 3(D) show schematic views of a sealing surface of a box of a threaded joint. FIGS. 3(A) to 3(C) show examples of a box sealing surface according to the present invention. FIG. 3(A) shows a sealing surface having a first curved surface portion with a large radius of curvature (RA), a tapered surface portion (TA), and a second curved surface portion with a large radius of curvature (RB). Similarly, FIG. 3(B) shows a sealing surface having a first curved surface portion with a large radius of curvature (RA), a tapered surface portion (TA), and a second curved surface portion with a large radius of curvature (RB), but the length of at least one of the first and second curved surface portion and the tapered surface portion is different from that of the sealing surface shown in FIG. 1(A). FIG. 3(C) shows a sealing surface having a third curved surface with a large radius of curvature (RC) is added before a first curved surface portion with a large radius of curvature (RA) followed by a tapered surface portion (TA) and a second curved surface portion with a large radius of curvature (RB). FIG. 3(D) shows a comparative example of a box sealing surface having only a first curved surface portion with a large radius of curvature (RA) and a tapered surface portion (TA), as described in Patent Document 1 and shown in FIG. 4.

The sealing surface 23 is distinguished from adjoining regions by a point where the slope changes discontinuously or by a curve having a small radius of curvature R (at most 6 mm). In FIGS. 3(A)-3(D), the sealing surface 23 has borders 51 and 56 on both ends having small radii of curvature Rx and Ry (both at most 6 mm), respectively. In FIG. 3(A), the range or the axial length of the sealing surface is shown by reference number 58. As mentioned before, the axial length of the sealing surface is approximately 2.5-8 mm with a pipe of the size used in oil country tubular goods (having an outer diameter of approximately 50-550 mm).

FIG. 3(A) is obtained by adding a second curved surface portion with a large radius of curvature 55 (RB) to the comparative example of a sealing surface 23 shown in FIG. 3(D), which comprises a first curved surface portion with a large radius of curvature 53 (RA) and a tapered surface portion 54 (TA). By providing a second curved surface portion with a large radius of curvature 55 (RB) on the side of the tapered surface portion closer to the shoulder portion, the problem of microgalling can be reduced. The radius of curvature and the axial length of the second curved surface portion (RB) may be the same as or different from those of the first curved surface portion (RA) as long as they are both a large radius of curvature. Preferably, the radius of curvature of the first curved surface portion (RA) is larger than that of the second curved surface portion (RB).

FIG. 3(B) is an example which is the same as the example of FIG. 3(A) except that the proportion of the lengths of a surface with a large radius of curvature 53 (RA) and a tapered surface portion 54 (TA) is varied. The proportion of the length of the tapered surface portion 54 is preferably about 0.1-0.6 and more preferably about 0.1-0.45, and most preferably about 0.1-0.3 of the whole length of the sealing surface. Thus, the axial length of the tapered portion 54 is preferably at least 0.5 mm and more preferably at least 1 mm.

In FIG. 3(C), a third curved surface portion with a large radius of curvature 52 (RC) is provided between the first curved surface with a large radius of curvature 53 (RA) and the border 51 (Rx) of FIG. 3(A). The large radius of curvature RC of surface 52 is preferably smaller than the large radius of curvature RA of surface 53. As a result, the sealing surfaces of the pin and the box do not contact each other at the border 51 which has a small radius of curvature Rx, and the contact pressure in this area can be decreased. As a result, more stable contact between the sealing surfaces can be achieved.

The angle of slope (angle of inclination) of the tapered surface portion (TA) in the sealing surface of the box is preferably the same as that of the tapered surface which solely constitutes the sealing surface of the pin, although a small difference within 5 degrees can be allowed between the angles of slope of the pin and the box.

As mentioned before, the angle of slope of the tapered surface portion in a sealing surface of a box according to the present invention and that of the tapered surface of the pin is preferably 5-25 degrees and more preferably 8-20 degrees in order to ensure that the sealing surfaces achieve their sealing function effectively. If this angle is too steep (too large), the sealing contact pressure at the time of application of a tensile load decreases, while if it is too shallow (too small), galling can easily take place due to an increase in the distance of sliding.

Figure 7A:
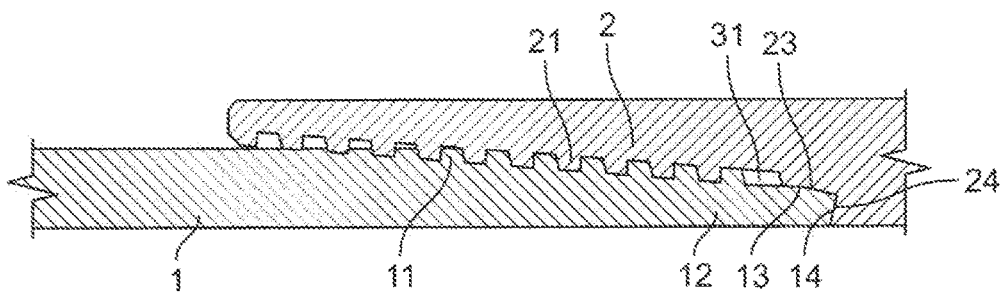
FIG. 7 shows schematic cross-sectional views of a typical conventional premium joint for oil country tubular goods of the coupling type, FIG. 7(A) being a partial view showing only one side of the joint and FIG. 7(B) being an overall view.
Figure 7B:
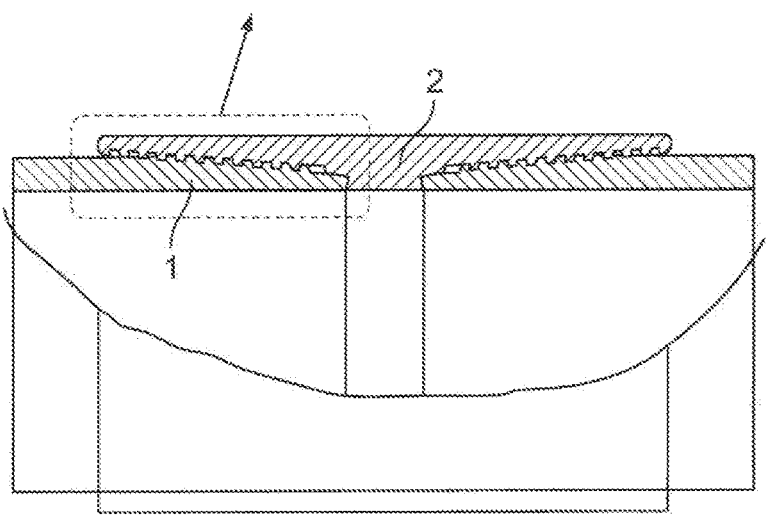

The above explanation pertains primarily to the threaded joint for steel pipes shown in FIG. 1 having a tapered non-contacting region and shoulder surfaces with two-step contour, but the structure of the sealing surfaces 13, 23 of the pin and the box according to the present invention is also effective with a threaded joint for steel pipes having a nose portion like that shown in FIG. 2 having a cylindrical non-contacting region and generally vertical shoulder surfaces. It can also be applied to the sealing surfaces 13, 23 of a typical premium joint as shown in FIG. 7.

Examples

In order to illustrate the effects of the present invention, a Series A test specified by ISO 13679 was carried out on a threaded joint for casing measuring 9⅝ inch in diameter and weighing 53.5 pounds per foot (outer diameter of 244.48 mm and wall thickness of 13.84 mm). A pin was formed on the exterior at both ends of a steel pipe and a box was formed on the interior at both sides of a coupling. The threaded joint subjected to this test which was made of L80 steel (carbon steel) specified by API (American Petroleum Institute) standards had the basic shape of a threaded joint for oil country tubular goods of the coupling type shown in FIG. 7 except for the shape of its lip portion, which was an extended lip having a shape as shown in FIG. 1(A) or FIG. 2 including a sealing surface, a shoulder surface and a non-contacting region between the sealing surface and the shoulder surface for each of the pin and the box. The angle of slope of the tapered surface (portion) in the sealing surfaces of the pin and the box was 14 degrees. Two threaded joints (A) and (B) in which the shape of the sealing surface of the box is different from each other were provided for a gas tightness test.

In one threaded joint (A) which was an example according to the present invention, the pin had a lip portion of the shape shown in FIG. 1(A) including a tapered sealing surface, a tapered non-contacting region, and a shoulder surface with two-step contour having a main shoulder surface portion and a sub-shoulder surface portion. The axial length 45 of the pin lip portion was 15 mm, and the axial length 49 of the sub-shoulder surface portion was 3.99 mm. The reverse angle 42 of the main shoulder surface portion was 15 degrees and the angle of slope 43 of the sub-shoulder surface portion with respect to the joint axis was 20 degrees. The angle of chamfer 17 with respect to the joint axis was 15 degrees. The box which had the shape shown in FIG. 1(A) had a sealing surface of the shape shown in FIG. 3(A) in which beginning from the side closest to the female threads, it had a curved surface with a large radius of curvature 53 with a radius R60 (for an axial length of 1.75 mm), a tapered surface portion 54 (for an axial length of 1.0 mm), and a curved surface with a large radius of curvature 55 with a radius R25 (for an axial length of 1.0 mm). R60 and R25 indicate that the radius of curvatures are 60 mm and 25 mm, respectively. The angle of slope of the tapered surface portion in the sealing surface of the box was 14 degrees as in the tapered sealing surface of the pin.

In the other threaded joint (B), the pin had a lip portion of the shape shown in FIG. 2 including a tapered sealing surface and a cylindrical non-contacting region. The axial length of the lip portion was 15 mm. The corresponding box had a sealing surface of the shape shown in FIG. 3(D) having a curved surface with a large radius of curvature 53 with a radius R60 (for an axial length of 1.75 mm) and a tapered surface portion 54 (for an axial length of 1.75 mm). The angle of slope of the tapered surface portion in the sealing surface of the box was 14 degrees as in the tapered sealing surface of the pin.

When these two threaded joints were subjected to the severe Series A test specified by ISO 13679 according to which combined load of tension, compression, and internal and external pressure was repeatedly applied, no microgalling occurred in threaded joint (A) according to the present invention. With this threaded joint, no leaks were observed, the sealing surfaces after this gas tightness test were smooth, and surface roughening or the like was not observed.

In contrast, in threaded joint (B) as described in Patent Document 1, the occurrence of microgalling was observed, and as a result, leak was also found.

The above explanation is of specific modes of the present invention, but this explanation is merely an example, and the present invention is not limited to these modes.

The invention claimed is:

1. A threaded joint for steel pipes comprising a pin and a box in which the pin has male threads and a lip portion having a sealing surface and a shoulder surface, and the box has female threads, a sealing surface, and a shoulder surface, wherein at the time of make-up, the male threads engage with the female threads, the sealing surface of the pin sealingly contacts the sealing surface of the box, and the shoulder surface of the pin abuts the shoulder surface of the box, wherein the sealing surface of the pin is constituted solely by a tapered surface portion, the sealing surface of the box comprises, in a direction from the female threads towards the shoulder surface, a first curved surface having a radius of curvature from 15 mm to 120 mm, a tapered surface, and a second curved surface having a radius of curvature from 15 mm to 120 mm, the tapered surface is a surface produced by rotating a straight line which is sloped with respect to a joint axis about the joint axis, and a part of the sealing surface of the box between the first curved surface and the second curved surface is constituted solely by the tapered surface.

2. A threaded joint for steel pipes as set forth in claim 1 wherein an angle of slope of the tapered sealing surface of the pin and the tapered surface of the sealing surface of the box with respect to the joint axis is 5-25 degrees.

3. A threaded joint for steel pipes as set forth in claim 1 wherein the shoulder surface of the pin is disposed on an end surface of the pin, the sealing surface of the pin is disposed in a vicinity of the male threads between the male threads and the end surface of the pin, and a non-contacting region in which the pin and the box do not contact each other is disposed in each of the pin and the box at a position between the sealing surface and the shoulder surface.

4. A threaded joint for steel pipes as set forth in claim 3 wherein the shoulder surface of each of the pin and box includes two distinct adjoining surfaces constituted by a main shoulder surface on a radially inner side and a sub-shoulder surface on a radially outer side, the main shoulder surfaces of the pin and the box being disposed so as to prevent radially inward deformation of an end portion of the lip portion, the sub-shoulder surfaces of the pin and the box being disposed so as to limit radially outward deformation of the end portion of the lip portion, a radial dimension of the main shoulder surface of the pin being larger than that of the sub-shoulder surface of the pin, and at least the main shoulder surface of the pin abutting the main shoulder surface of the box in an axial direction upon making-up.

* * * * *